(12) United States Patent
Tsuda et al.

(10) Patent No.: US 7,279,203 B2
(45) Date of Patent: Oct. 9, 2007

(54) LIQUID CRYSTAL PANEL

(75) Inventors: Hideaki Tsuda, Kawasaki (JP); Seiji Tanuma, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 215 days.

(21) Appl. No.: 10/804,303

(22) Filed: Mar. 19, 2004

(65) Prior Publication Data

US 2004/0191428 A1    Sep. 30, 2004

(30) Foreign Application Priority Data

Mar. 26, 2003 (JP) ............................. 2003-084502

(51) Int. Cl.
*C09K 19/56* (2006.01)

(52) U.S. Cl. ............... 428/1.2; 349/124; 252/299.4

(58) Field of Classification Search .......... 428/1.1–1.2, 428/1.31, 1.54–1.55, 1.5; 349/160, 104–106, 349/123–125, 141–144; 252/299.4
See application file for complete search history.

(56) References Cited

U.S. PATENT DOCUMENTS

| | | | |
|---|---|---|---|
| 3,803,050 A * | 4/1974 | Haas et al. ............... 252/299.4 |
| 3,848,966 A * | 11/1974 | Smith et al. ............... 349/163 |
| 5,186,986 A * | 2/1993 | Ogawa ...................... 428/1.23 |
| 5,307,190 A * | 4/1994 | Wakita et al. ............. 349/158 |
| 5,496,497 A * | 3/1996 | Takiguchi et al. ...... 252/299.01 |
| 5,725,915 A * | 3/1998 | Ishitaka et al. ............ 428/1.31 |
| 6,055,031 A * | 4/2000 | Lowe .......................... 349/74 |
| 6,266,111 B1 * | 7/2001 | Kataoka et al. ............ 349/113 |
| 6,287,649 B1 * | 9/2001 | Fukushima et al. .......... 428/1.2 |
| 6,540,940 B1 * | 4/2003 | Negoro et al. ......... 252/299.01 |
| 6,801,286 B2 * | 10/2004 | Yamaguchi et al. ........ 349/129 |
| 6,819,375 B2 * | 11/2004 | Wachi ........................ 349/106 |
| 6,858,423 B1 * | 2/2005 | Abbott et al. ............. 435/287.2 |
| 6,905,640 B2 * | 6/2005 | Tanaka ...................... 264/1.34 |
| 2003/0231272 A1 * | 12/2003 | Nakamura et al. .......... 349/123 |
| 2005/0109985 A1 | 5/2005 | Kataoka et al. |

FOREIGN PATENT DOCUMENTS

| | | |
|---|---|---|
| JP | 05-113557 | 5/1993 |
| JP | 5-71821 | 9/1993 |
| JP | 06-265858 | 9/1994 |
| JP | 06-289374 | 10/1994 |
| JP | 08-15707 | 1/1996 |

* cited by examiner

*Primary Examiner*—Rena Dye
*Assistant Examiner*—Sow-Fun Hon
(74) *Attorney, Agent, or Firm*—Greer, Burns & Crain, Ltd.

(57) ABSTRACT

A liquid crystal panel is provided that has a liquid crystal layer sandwiched between a pair of substrates, wherein the liquid crystal layer comprises a liquid crystal and a cross-linked resin, the cross-linked resin comprises a cross-linked structural part adhered to a liquid crystal layer contacting surface and a terminal part rising from the liquid crystal layer contacting surface, and at least one of three conditions: the outer surface of at least one substrate is curved; a liquid crystal layer contacting surface is curved; and the thickness of one of the substrates is not more than ½ of the thickness of the other substrate, is satisfied. It is possible to obtain a liquid crystal panel having increased freedom in the appearance, device weight reduction, simplified structure, etc. by improving the outer and/or inner surfaces of the device.

37 Claims, 6 Drawing Sheets

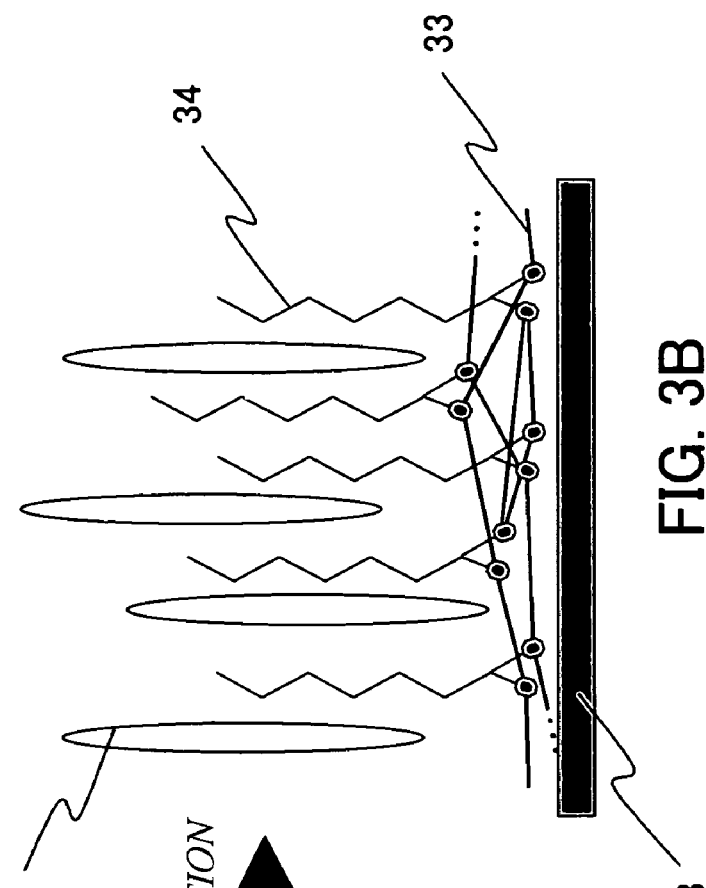
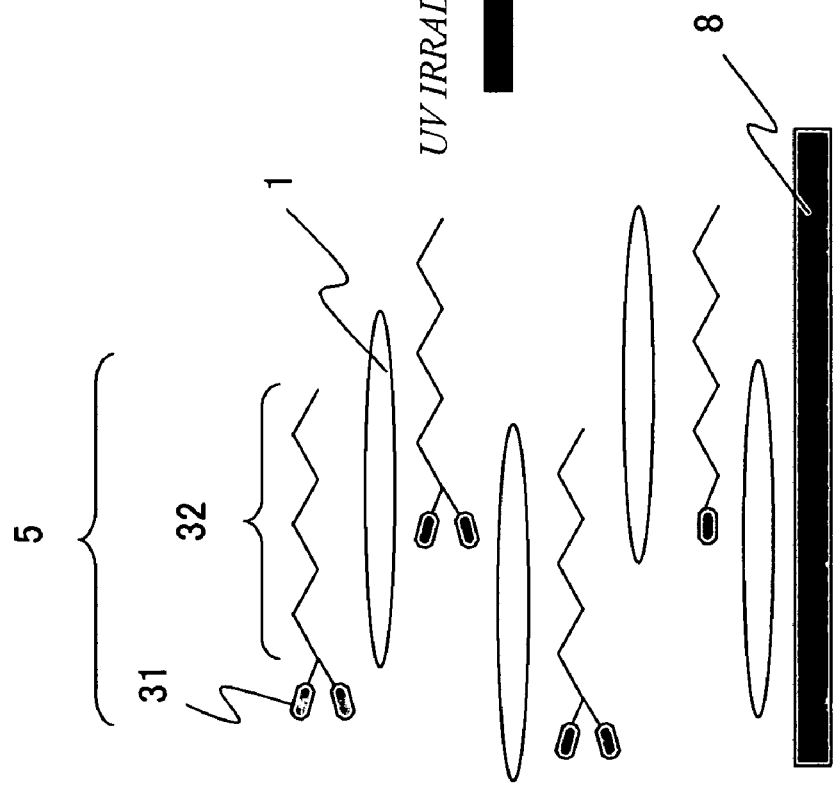
FIG. 3B
FIG. 3A
UV IRRADIATION

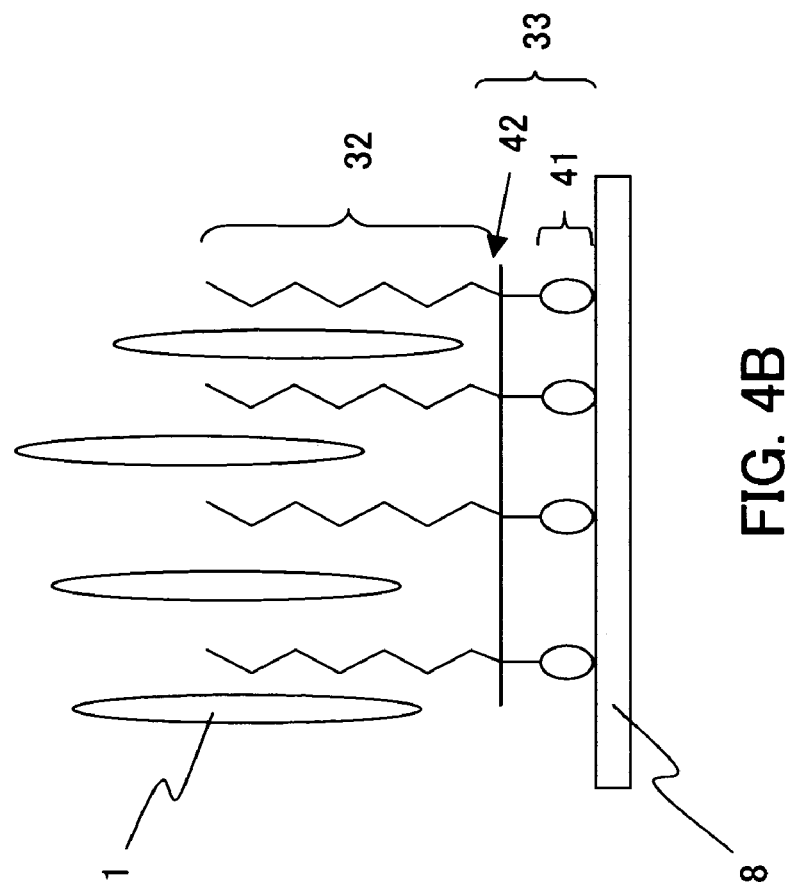
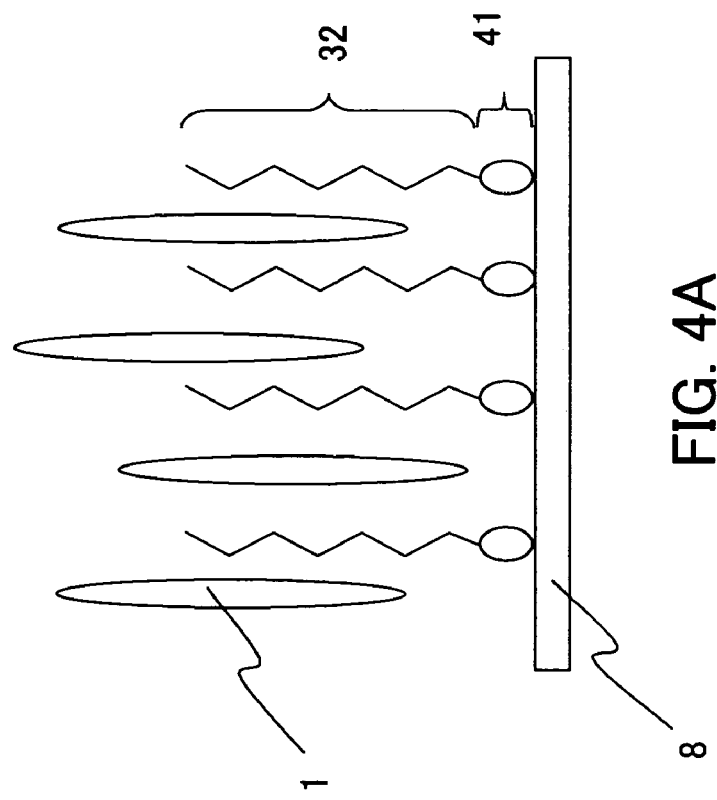

LIQUID CRYSTAL PANEL

BACKGROUND OF THE INVENTION

1. Field of the Invention

The present invention relates to a liquid crystal panel with improved outer and/or inner surfaces.

2. Description of the Related Art

Conventional liquid crystal panels are flat panel displays manufactured by bonding together a pair of flat substrates represented by glass, or liquid crystal panels for which substrates such as plastic substrates are used.

FIG. 1 is a model view illustrating the manufacturing flow for a conventional liquid crystal panel. Going down from the top of FIG. 1 to the bottom, first, a substrate 2 that has not an alignment control film coated thereon is prepared according to step S1, an alignment control film 6 composed of a polyimide or the like is formed on the substrate 2 according to step S2, substrate treating such as rubbing is optionally performed according to step S3, bonding with another substrate 3 is performed according to step S4, a liquid crystal is filled in the space according to step S5, and the filling inlet is sealed according to step S6. Thus, a liquid crystal display panel is prepared. The liquid crystal layer 10 is sealed with the substrates 2 and 3, and a sealing member 7 and encapsulant 11.

In the conventional manufacturing process, it is difficult to form an alignment control film on a substrate having a curved surface. In other words, when a substrate has a curved surface, an alignment control film with which the liquid crystal layer comes in contact must have a curved surface. However, the printing step and the spin coating step that are effective for the conventional flat substrates are hard to be used in forming an alignment control film on a curved surface. The situation is the same, in general, if a liquid crystal layer contacting surface is curved, even when the substrates do not have a curved surface. It is to be noted that the "liquid crystal layer contacting surface" according to the present invention means the surface of a layer that a liquid crystal layer actually contacts. For example, when a substrate and a liquid crystal layer are laminated with a filter layer or electrode layer in between, and the liquid crystal layer actually contacts the surfaces of the filters or electrodes, but not the surface of the substrate, the "liquid crystal layer contacting surface" according to the present invention means the surfaces of the filters or electrodes that the liquid crystal contacts. If the surfaces of the filters or electrodes have been subjected to a treatment to give hydrophilicity, the treated surface is the liquid crystal layer contacting surface, for example.

Furthermore, there is a limit in thinning a substrate for the conventional liquid crystal panel. In other words, when a substrate thinner than a certain level is used, the printing process and the spin coating process that are effective in the conventional production processes are hard to be used in forming an alignment control film. In addition, such a substrate is susceptible to plastic deformation at a conventional high-temperature baking treatment, while a low-temperature treatment results in a low level of alignment control, leading to an insufficient reliability in the electric performances.

Accordingly, there are various technical limitations caused by the fact that the installation of the alignment control film is indispensable.

On the other hand, regarding technologies for enhancing the alignment properties of a liquid crystal, there are a liquid crystal existing as independent particles in a ionizing radiation-cured resin matrix (for example, see Japanese Unexamined Patent Application Publication No. 5-113557, claims), a polymerizable monomer having an alkyl side chain being cured with a liquid crystal (for example, see Japanese Unexamined Patent Application Publication No. 6-265858, claims), a polymeric network structure-coated layer (for example, see Japanese Unexamined Patent Application Publication No. 6-289374, claims), a liquid crystal material in which a photopolymerizable acrylate having a liquid crystal skeleton structure is included (for example, see Japanese Unexamined Patent Application Publication No. 8-15707, claims), etc. However, it is believed that omission of the alignment control film has been still an unanswered technology.

SUMMARY OF THE INVENTION

It is an object of the present invention to solve the above-described problems and to provide a liquid crystal panel with improved outer and/or inner surfaces. Other purposes and advantages of the present invention will become clear by the explanations below.

According to one aspect of the present invention, a liquid crystal panel is provided that has a liquid crystal layer sandwiched between a pair of substrates, wherein the liquid crystal layer comprises a liquid crystal and a cross-linked resin, the cross-linked resin comprises a cross-linked structural part adhered to a liquid crystal layer contacting surface (adhered, cross-linked structural part) and a terminal part rising from the liquid crystal layer contacting surface (rising terminal part), and at least one of three conditions: the outer surface of at least one substrate is curved; a liquid crystal layer contacting surface is curved; and the thickness of one of the substrates is not more than ½ of the thickness of the other substrate, is satisfied.

According to this aspect of invention, a liquid crystal panel having freedom in the appearance, light device weight, simplified structures, etc. is obtained by improving the outer and/or inner surfaces of the device.

Furthermore, it is preferable that the liquid crystal panel has a filter layer, and the liquid crystal layer contacting surface is the surface of the filter layer or the surface of an electrode or electrodes installed in contact with the filter layer, that the curved surface of the liquid crystal layer contacting surface is composed of a plurality of concavities or convexities or both of them, that the thickness of at least one of the substrates is in the range of from 100 to 500 µm, that the material of one substrate is different from that of the other substrate, that the substrates comprise a glass substrate and a plastic substrate, that the liquid crystal tilts while the tilting direction is regulated by uneven parts or blank parts (slits) of an electrode or electrodes when voltage is applied, that the panel does not have an alignment control film, that the liquid crystal has a negative dielectric constant anisotropy, etc.

Furthermore, it is preferable that the liquid crystal layer is formed by cross-linking, in the presence of a liquid crystal, a resin composition comprising one or more first compounds having a cross-linkable structural part, and a hydrophobic terminal part with a straight-chain section having three or more carbon atoms (hydrophobic, long-chain the first compound(s) comprises a polar-group structural part, that at least one compound represented by formula (1) or (2) below is included as the first compound(s),

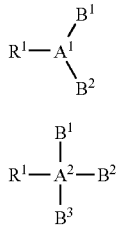

(1)

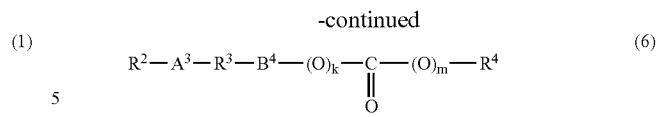

(in formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other in the formulae), that the one or more first compounds comprise a second compound with a cross-linkable structural part and substantially without a hydrophobic, long-chain terminal part, that at least one compound selected from the group consisting of the compounds represented by formulae (3) to (6) below is included as the second compound,

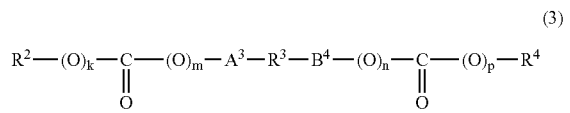

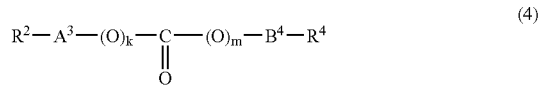

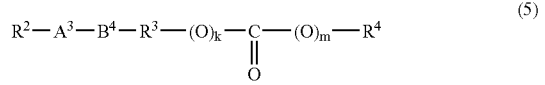

-continued

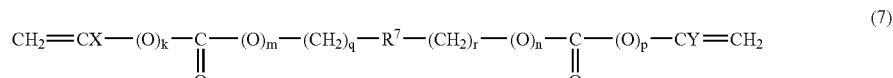

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from-each other in the formulae), that at least one compound selected from the group consisting of the compounds represented by formulae (7) to (10) below is included as the second compound,

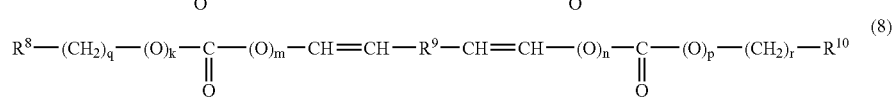

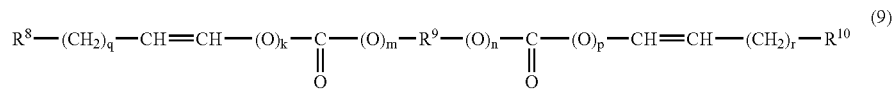

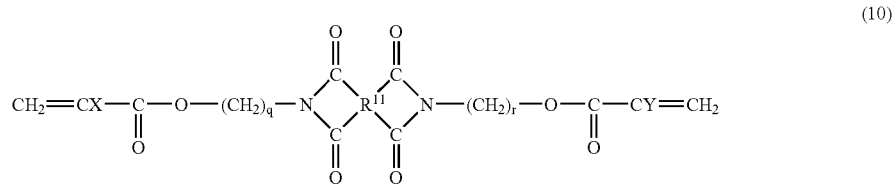

(in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other in the formulae), Furthermore, it is possible to form a liquid crystal panel by stacking a plurality of the above-described liquid crystal panels.

By the present invention, it is possible to obtain a liquid crystal panel having an improved outer surface and increased freedom in the appearance. It is also possible to reduce the weight of the liquid crystal panel and make it flexible. Furthermore, it is possible to improve the inner surfaces of the device in order to realize a liquid crystal panel with a simplified, compact structure.

BRIEF DESCRIPTION OF THE DRAWINGS

FIG. 3A is a model view illustrating cross-linkable structural parts and hydrophobic, long-chain terminal parts that form a basis for the present invention;

FIG. 3B is a model view illustrating an adhered, cross-linked structural part and rising terminal parts that form a basis for the present invention;

FIG. 4A is a model view illustrating a case in which parts in a material having a high polarity are adsorbed onto the liquid crystal layer contacting surface, and hydrophobic, long-chain terminal parts rise in the vertical direction to the liquid crystal layer contacting surface;

FIG. 4B is another model view illustrating a case in which an adhered, cross-linked structural part comprises a polar group structural part;

DESCRIPTION OF THE PREFERRED EMBODIMENTS

Figure 1:
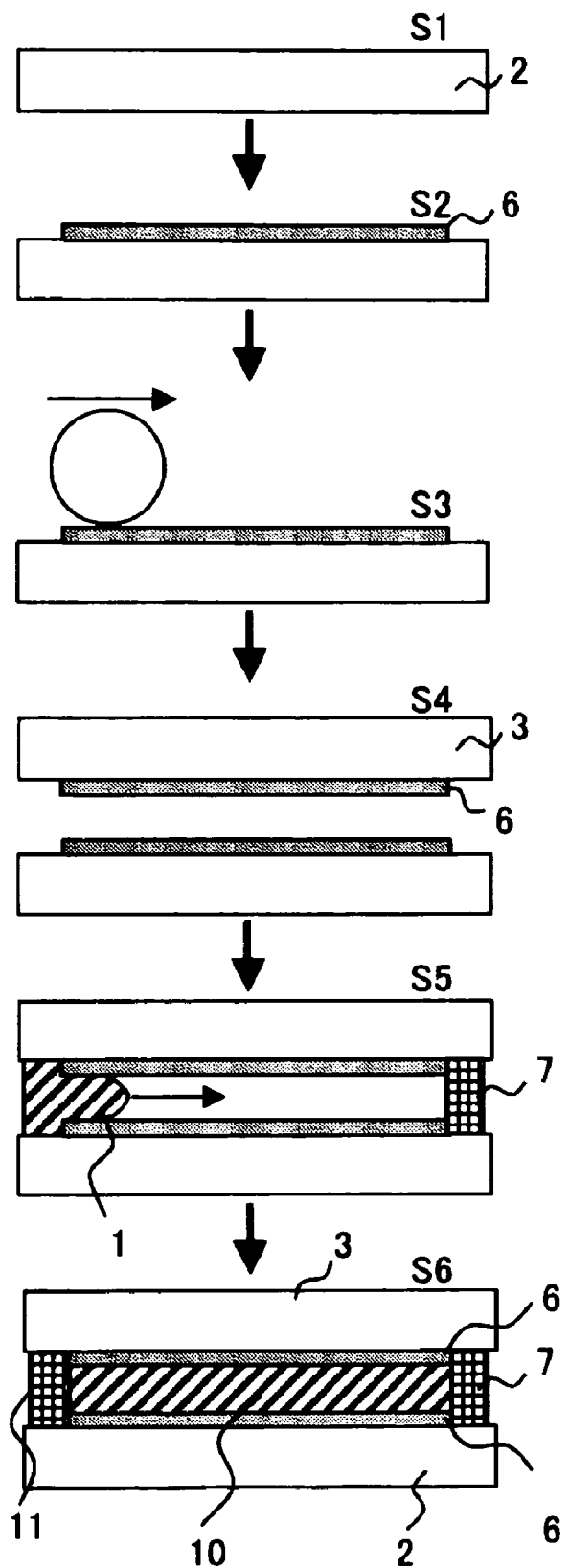
FIG. 1 illustrates a production flow of a conventional liquid crystal panel.

Embodiments according to the present invention will be described with reference to the following figures, formulae, examples, etc. It is to be understood that these figures, formulae, examples, etc., plus the explanation below are for the purpose of illustrating the present invention, and do not limit the scope of the present invention. It goes without saying that other embodiments should also be included in the category of the present invention as long as they conform to the gist of the present invention. It is to be noted that the "structural part" in this specification means, when, for example, a polar-group structural part is referred to, a part having a polar group. In other words, the "structural part" may also include chemical structures other than a polar group For example, when a polar group is COOH, $CH_2COOH$ can be considered a polar-group structural part. This "structural part" may be located at the end section or at an intermediate section of a molecule or cross-linked material. For example, $CH_2OCO$— can be included in a polar-group structural part, too. In contrast, the "terminal part" means a part constituting the end section of a molecule or cross-linked material.

In a liquid crystal panel according to the present invention, a liquid crystal layer sandwiched between a pair of substrates comprises a liquid crystal and a cross-linked resin, and this cross-linked resin has a cross-linked structural part adhered to the liquid crystal layer contacting surface (adhered, cross-linked structural part) and a terminal part rising from the liquid crystal layer contacting surface (rising terminal part). It is considered that this cross-linked resin plays a role of regulating the director direction of a liquid crystal, whereby a liquid crystal is aligned in the vertical direction when no voltage is applied.

To be concrete, it is considered that a hydrophobic, long-chain terminal part that will be described later is bonded to the adhered, cross-linked structural part so as to have a structure in which the hydrophobic, long-chain terminal part rises from the liquid crystal layer contacting surface, whereby the liquid crystal is aligned in the vertical direction when no voltage is applied.

This cross-linked resin can be formed by cross-linking, in the presence of a liquid crystal, a resin composition comprising one or more compounds having a cross-linkable structural part and a structural part with a certain level of chain length. To be more concrete, it is preferable to use, as the above-described compound, one or more first compounds having a cross-linkable structural part and a hydrophobic terminal part with a straight-chain section having three or more carbon atoms (hydrophobic, long-chain terminal part).

In such a case, it is possible to determine whether the adhered, cross-linked structural part is realized or not, by determining, through a surface analysis or the like, whether cross-linking adhered onto the liquid crystal layer contacting surface exists or not when polymerization with cross-linking has actually occurred. The level of adhesion can be decided arbitrarily according to the practical level of displaying performance as required for a liquid crystal panel.

Whether a structure where the structural part having a certain level of chain length will rise from the liquid crystal layer contacting surface is realized, can be determined by whether alignment of a liquid crystal is shown without an alignment control film when a liquid crystal panel is actually prepared. The required level of alignment can be arbitrarily chosen according to the practices. The first compound(s) having a hydrophobic, long-chain terminal part often serves for realizing such alignment.

In the present invention, it is stipulated that a liquid crystal layer includes a liquid crystal and a cross-linked resin. However, among constituents of the cross-linked resin, the adhered, cross-linked structural part is located on the liquid crystal layer contacting surface, and the rising terminal part is located in the vicinity of the adhered, cross-linked structural part. Accordingly, it may sometimes be possible to consider that the cross-linked resin forms a layer or layers distinct from the liquid crystal. While the cross-linked resin is generally formed on the liquid crystal layer contacting surfaces on both sides of the liquid crystal layer, it is also possible, in many cases, to regard the liquid crystal layer as being composed of two types of layers: a layer mainly comprising a liquid crystal and a layer or layers made of a cross-linked resin.

For example, when this cross-linked resin is formed by cross-linking, in the presence of a liquid crystal, a resin composition comprising one or more compounds having a cross-linkable structural part and a structural part having a certain level of chain length, the resin composition is in a state in which it is uniformly mixed with a liquid crystal prior to the cross-linking, while when a cross-linked resin has been formed, a state in which the cross-linked resin and the liquid crystal are mostly separated from each other, can occur. However, the present invention may also include embodiments wherein other cross-linked resins coexist in the liquid crystal.

Here, the above-described first compound(s) is not limited to the case in which one molecule has a cross-linkable structural part and a hydrophobic, long-chain terminal part, but may also be a mixture of a compound having a cross-linkable structural part and a compound having a hydrophobic, long-chain terminal part.

It is preferable that the adhered, cross-linked structural part has a polar-group structural part, since the adhered, cross-linked structural part sticks to the liquid crystal layer contacting surface more strongly when a polar-group structural part is present. The term "polar-group structural part" for the cross-linked resin is used in the same meaning as for the above-described first compound(s). The detail will be explained later.

As a cross-linkable structural part, exemplified is a structural part having a photoreactable group that has a polymerizable double bond such as an acrylate group, a methacrylate group, a vinyl group and an allyl group, and that is polymerizable with other molecules by an active energy ray such as UV irradiation. When the cross-linkable structural part of the first compound(s) has two or more polymerizable double bonds in a molecule, the reactivity will be enhanced and a network-structure polymer film can be formed from a single compound, so that a cross-linked structure is easily formed. Accordingly, this is preferable. A case in which one compound has polymerizable double bonds at two or more end sections of one molecule or in the vicinity is an example. However, as a first compound(s), it is sufficient if the whole of the "one or more first compounds" has a cross-linkable structural part, and accordingly, compounds that include a compound having one polymerizable double bond in a molecule that can only extend the polymeric chain and lacks an ability of its own to cross-link, can also be included in the category of the "one or more first compounds having a cross-linkable structural part", for example.

As a cross-linkable structural part according to the present invention, one that is cross-linkable with an active energy ray is preferable, since the cross-linked structure is easily realized. Accordingly, explanation is mainly made to a structure having a photofunctional group. However, it is to be noted that those that can be cross-linked by other types of energy such as the other active energy rays and heat, can also be included in the category of the present invention. They may be used together.

The hydrophobic, long-chain terminal part plays a role of aligning a liquid crystal uniformly in the longitudinal direction of the hydrophobic, long-chain terminal part. The term "hydrophilic" means a state in which there are no polar groups, or chemically a state on the level of "not hydrophilic". The liquid crystal layer contacting surface such as a substrate surface is usually subjected to a UV treatment or the like to give hydrophilic properties. The hydrophobic properties are required so as to prevent the hydrophobic, long-chain terminal part from contacting the hydrophilic liquid crystal layer contacting surface, and accordingly, to make easy the hydrophobic, long-chain terminal part rise from the liquid crystal layer contacting surface. Typically, the hydrophobic, long-chain terminal part is preferably composed of carbon and hydrogen.

When the cross-linkable structural part of the first compound(s) comprises a polar-group structural part, adhesion of the adhered, cross-linked structural part to the liquid crystal layer contacting surface is easy and better alignment of a liquid crystal is realized. To achieve the purpose, there is no particular limitation to the type of the polar group and the number of the polar group per molecule. It is also important for the cross-linked resin after the cross-linking of the resin composition not to emit impurity ions into the liquid crystal so that the reliability of the liquid crystal panel is maintained. For this purpose, it is preferable that the polar-group structural part in the cross-linkable structural part of the first compound(s) does not generate impurity ions. Therefore, in many cases it is preferable to avoid those having functional groups such as $-SiCl_3$ group that tend to emit Cl ions. As a preferable polar group, CN, CO, COOH, COOR, OH and OR are enumerated. It is to be noted that R means an organic group, here.

This liquid crystal panel can be manufactured as follows, for example. First, two substrates on which alignment control films are not applied are prepared. A liquid crystal layer comprising, for example, a UV-curable compound having a structural part having a photoreactive group and a hydrophobic, long-chain terminal part, and a liquid crystal is sandwiched between them, and then, UV curing is performed to form on the substrate surfaces an adhered, cross-linked structural part bonded to hydrophobic, long-chain terminal parts.

FIGS. 3A and 3B illustrate an adhered, cross-linked structural part and rising terminal parts according to the basic principle of the present invention. Immediately after the introduction of an uncured liquid crystal composition comprising a liquid crystal and a resin composition, a first compound(s) 5 having a cross-linkable structural part 31 and a hydrophobic, long-chain terminal part 32, and a liquid crystal 1 are in a horizontally aligned state along the liquid crystal layer contacting surface 8 as shown in FIG. 3A. Nothing is formed on the surface of the liquid crystal layer contacting surface 8.

It was found that when UV irradiation, for example, was performed in this state, as shown in FIG. 3B, cross-linkable structural parts 31 are cross-linked with one another to form an adhered cross-linked structural part 33, hydrophobic, long-chain terminal parts 32 have a configuration of rising from the liquid crystal layer contacting surface 8 to form rising terminal parts 34.

It can be easily confirmed that the adhered, cross-linked structural part 33 actually adheres to the liquid crystal layer contacting surface, by taking out the liquid crystal layer contacting surface, performing cleaning or the like, and then, analyzing the surface. Furthermore, it can be easily confirmed that the rising terminal parts 34 actually rise, by the fact that the liquid crystal 1 shows vertical alignment. Accordingly, it is possible to align the liquid crystal 1 vertically when no voltage is applied.

In the alignment by this constitution, it can be considered that differently from the conventional, so-called polymer dispersion liquid crystal (PDLC), a polymer for making the alignment of the liquid crystal possible, is not formed all over the liquid crystal layer, and the alignment is controlled by the cooperative actions of the thin-film, adhered, cross-linked structural part 33 formed on the liquid crystal layer contacting surface, and the rising terminal parts 34. It is to be noted that usually, both of the two liquid crystal layer contacting surfaces have thin-film, adhered, cross-linked, structural parts 33.

To be concrete, it is preferable that the first compound(s) for use in the present invention comprises at least one compound represented by the above-described formula (1) or (2). In the formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other, in the formulae as well as in the other formulae.

As a compound represented by formula (1), materials having the structures represented by formulae (11)-(13) below are exemplified.

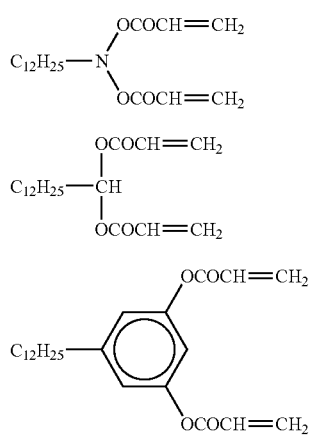

As a compound represented by formula (2), materials having the structures represented by formulae (14) and (15) below are exemplified.

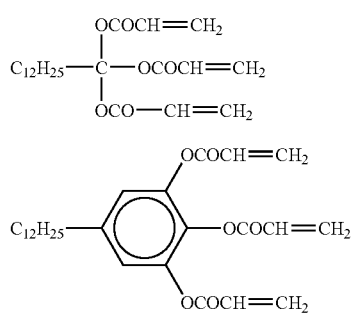

Taking compounds represented by formulae (1), (2), and (11)-(15) for example, explanations will be made on the cross-linkable structural part, adhered, cross-linked structural part, rising terminal part, hydrophobic, long-chain terminal part and polar-group structural part as described heretofore. $B^1$, $B^2$ and $B^3$ are cross-linkable structural parts and have an ability to form an adhered cross-linked structural part, $R^1$ forms a rising terminal part or hydrophobic, long-chain terminal part, and the OCO (or COO) bond forms a polar-group structural part.

As a compound in which the cross-linkable structural part includes a polar-group structural part, materials having structures represented by formulae (16) and (17) below are exemplified. In such a case, COOH or the like forms a polar-group structural part.

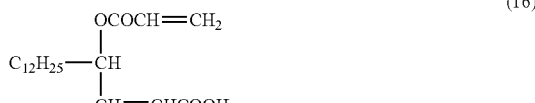

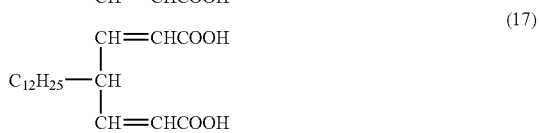

Here, the present invention is explained in relation with a case in which an adhered, cross-linked structural part has a polar-group structural part. A cross-linked resin is conventionally known that is formed and aligned so that polar-group structural parts 41 or parts in a material having a high polarity are adsorbed onto the liquid crystal layer contacting surface 8, and hydrophobic, long-chain terminal parts 32 rise in the vertical-direction to the liquid crystal layer contacting surface 8 as shown in FIG. 4A. In this stage, it is possible to align the liquid crystal in the direction vertical to the substrate surface. However, this state is thermally unstable, and the dissociation from the liquid crystal layer contacting surface tends to occur.

As a result of investigations, it was found that the dissociation from the liquid crystal layer contacting surface can be effectively prevented and the thermal stability can be improved by making the adhered, cross-linked structural part 33 in FIG. 3B have a polar-group structural part. In this case, there is no particular limitation to the locational relationship regarding where the adhered, cross-linked structural part 33 and the polar-group structural part are located, and an appropriate material can be determined, taking into consideration the ease of material procurement, dissociation prevention from the liquid crystal layer contacting surface, etc. In a typical example, as shown in FIG. 4B, when a structure is realized in which the cross-linked structural part 42 of the adhered, cross-linked structural part 33 is sandwiched by the hydrophobic, long-chain terminal part 32 and the polar-group structural part 41, the cross-linked structural part 42 of the adhered, cross-linked structural part 33 is probably formed as a kind of film, so that a stabler function to control the alignment is realized.

When such a structure is realized, a stable control of alignment of a liquid crystal on the same level as the one when an alignment control film is employed, is made possible, without treatments such as printing of an alignment control film which has been conventionally used for aligning a liquid crystal.

The first compound(s) having the structure described above may be used not only singly, but also as a mixture of a plural number of compounds. Other materials such as a cross-linking agent, catalyst and reaction accelerator may be used together.

There are cases in which it is preferable that the one or more first compounds include a second compound with a cross-linkable structural part and substantially without a hydrophobic, long-chain terminal part. For example, by having a second compound coexist that has only a cross-linkable structural part with a plurality of polymerizable groups in a molecule and does not have a hydrophobic, long-chain terminal part, it is possible to realize a state in which the mutual distances between the rising terminal parts rising from the adhered, cross-linked structural part adhered to the liquid crystal layer contacting surface are made wider, and accordingly, to improve the vertical alignment of the liquid crystal. In particular, widening of the mutual distances are useful when an alkyl group is used for the rising terminal part, because alkyl groups tend to be adsorbed by each other. A plural number of second compounds may be used.

Whether it lacks hydrophobic, long-chain terminal parts substantially, can be appropriately determined by seeing whether the mutual distances between the rising terminal parts can be widened, and accordingly, whether the vertical alignment of a liquid crystal is enhanced or the like. A simple group such as a methyl group and an ethyl group are not regarded as a hydrophobic, long-chain terminal part, in general.

Compounds represented by the above-described formulae, (3)-(6) exemplify such a second compound. In formulae (3)-(6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$ $A^3$, $B^4$, k, m, n and p can be selected independently from each other, in the formulae as well as in the other formulae. Here, the divalent group ($R^3$) described above is; for example, a methylene group, a 1,4-phenylene group, a 4,4'-biphenylene group or the like.

Examples of compounds represented by formulae (3)-(6) are shown below.

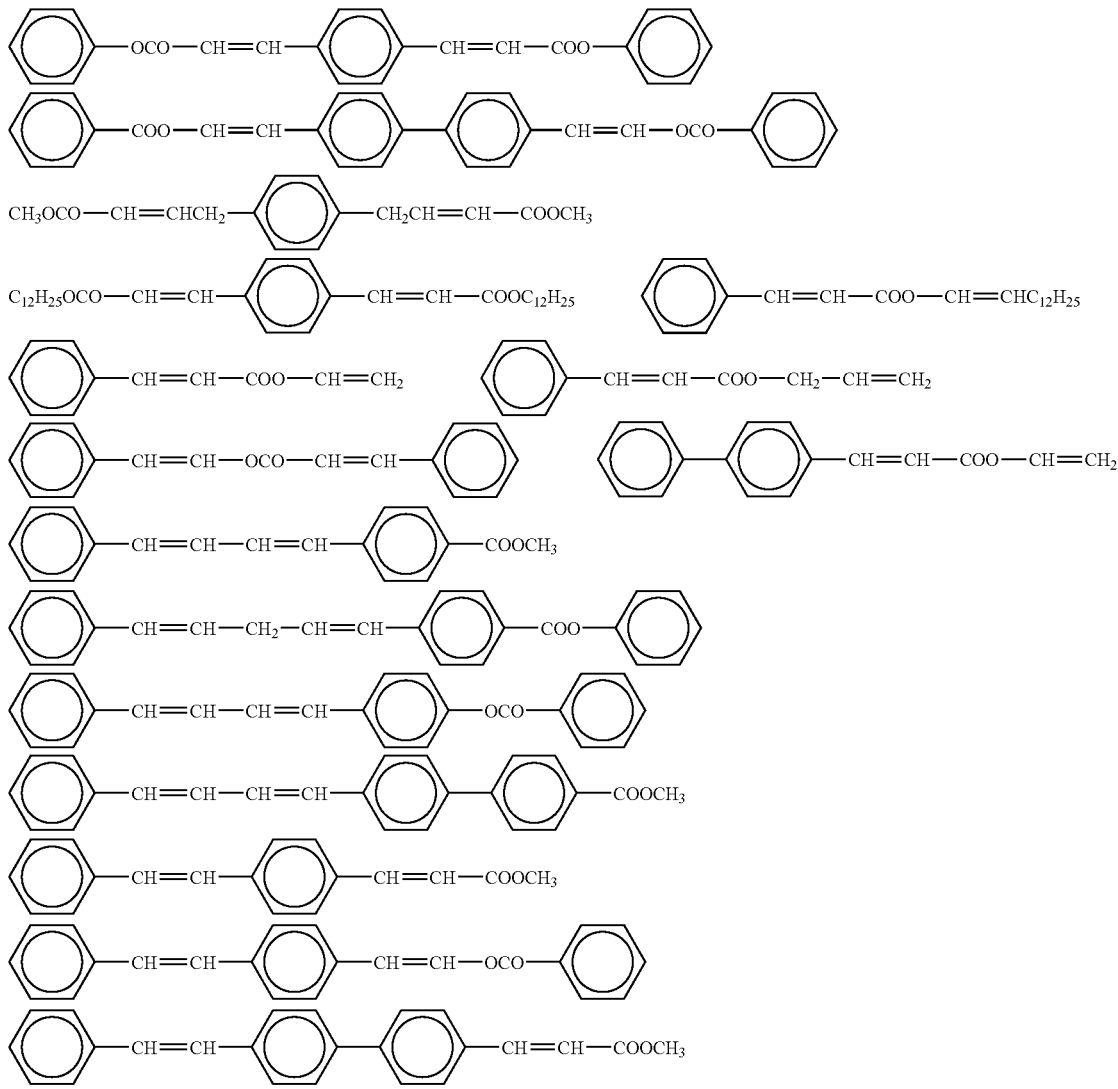

It is also preferable that the second compound has a five-member ring structure. As a five-member ring structure, cyclopentane, cyclopentene, cyclopentadiene, furan, pyrrole, indene, an acid anhydride structure such as succinic anhydride, maleic anhydride and phthalic anhydride, and an imide structure such as succinimide, maleimide and phthalimide, are enumerated. To be concrete, those shown below are examples of the compounds having the above-described structures. It is to be noted that the locations of substituting groups are not limited to those below.

As a second compound, compounds represented by the above-described formulae (7)-(10) are exemplified. In formulae (7)-(10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n, and p are, independently from each other, 0 (zero) or 1; q and r are, independently from each other, an integer not less than 0 (zero) and not more than 6; and $R^8$-$R^{10}$, k, m, n, p, q and r can be selected independently from each other, in the formulae as well as in the other formulae.

Examples of the compounds represented by formulae (7)-(10) are shown below.

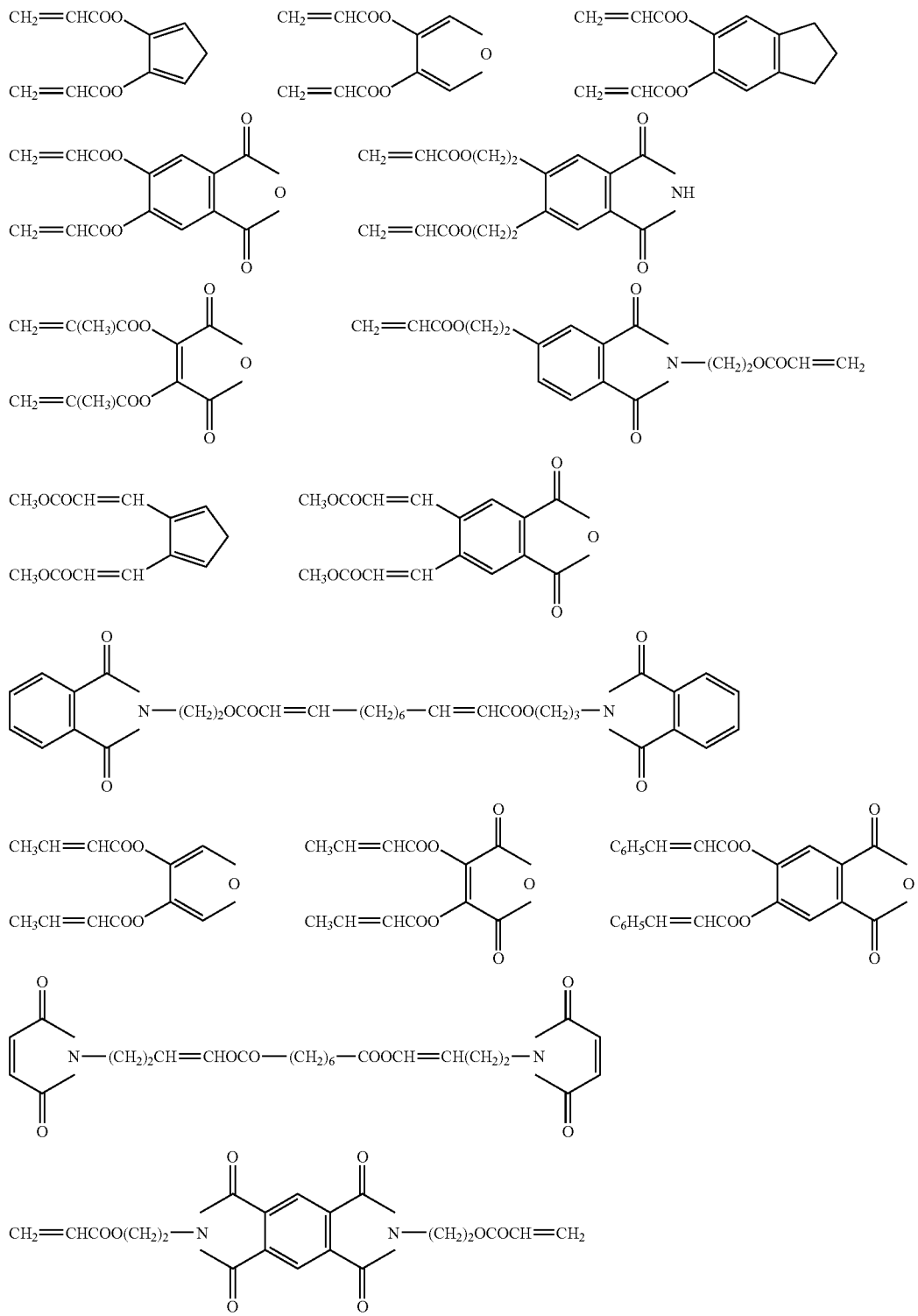

-continued

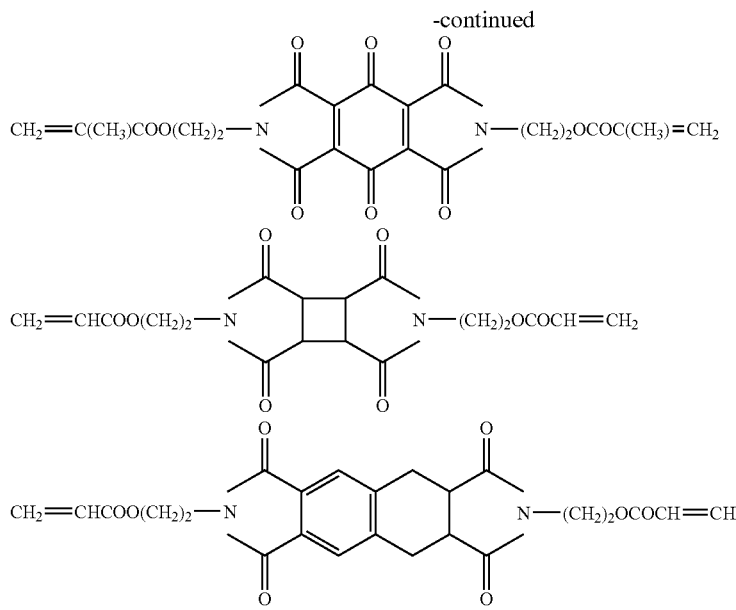

When compounds represented by formulae (3)-(10) are used, they react with less energy due to the resonance stabilization. That is, they are more easily reactable, compared with compounds without an aromatic ring, a carbonyl group or a five-member ring. In addition, the amount of an added polymerization initiator can be reduced by virtue of this. This reduction can lead to improved reliability of the liquid crystal panel. For example, if a large amount of an added polymerization initiator is applied, there will be more chance of generating reaction by-products with smaller molecular weights. Accordingly, a smaller amount of an added polymerization initiator is desirable.

As the second compound has a cross-linkable structural part and substantially lacks a hydrophobic, long-chain terminal part, it is preferable to use a third compound having one polymerizable group as well as a hydrophobic, long-chain terminal part together with the second compound. This is because the hydrophobic, long-chain terminal part can constitute rising terminal parts. A plurality of the third compounds may be used.

As the third compound, the following can be used, for example.

When those having such a long-chain alkyl group are used, the alkyl group parts extend from the plane of the adhered, cross-linked network structure part, and accordingly, the liquid crystal indicates vertical alignment. Therefore, using a compound represented by formula (3), (4), (5), (6), (7), (8), (9) or (10) for mixing, using a liquid crystal having a negative dielectric constant anisotropy as the liquid crystal, for example, and irradiating with UV rays as an energy source, a liquid crystal panel with vertical alignment can be manufactured without applying an alignment control film. In such a case, it is possible to make the liquid crystal tilted towards a specific direction, if the liquid crystal is made to tilt while the tilting direction is regulated by uneven parts or slits of an electrode or electrodes when voltage is applied.

In a method for manufacturing a liquid crystal panel according to the present invention, a resin composition comprising one or more first compounds having a cross-linkable structural part, and a hydrophobic, long-chain terminal part sandwiched between a pair of substrates is cross-linked in the presence of a liquid crystal to form the liquid crystal layer, so that the cross-linked resin has an adhered, cross-linked structural part and hydrophobic, long-chain terminal parts in the formed liquid crystal layer. It is preferable to have a structure in which the hydrophobic, long-chain terminal parts rise from the liquid crystal layer contacting surface.

Figure 2:
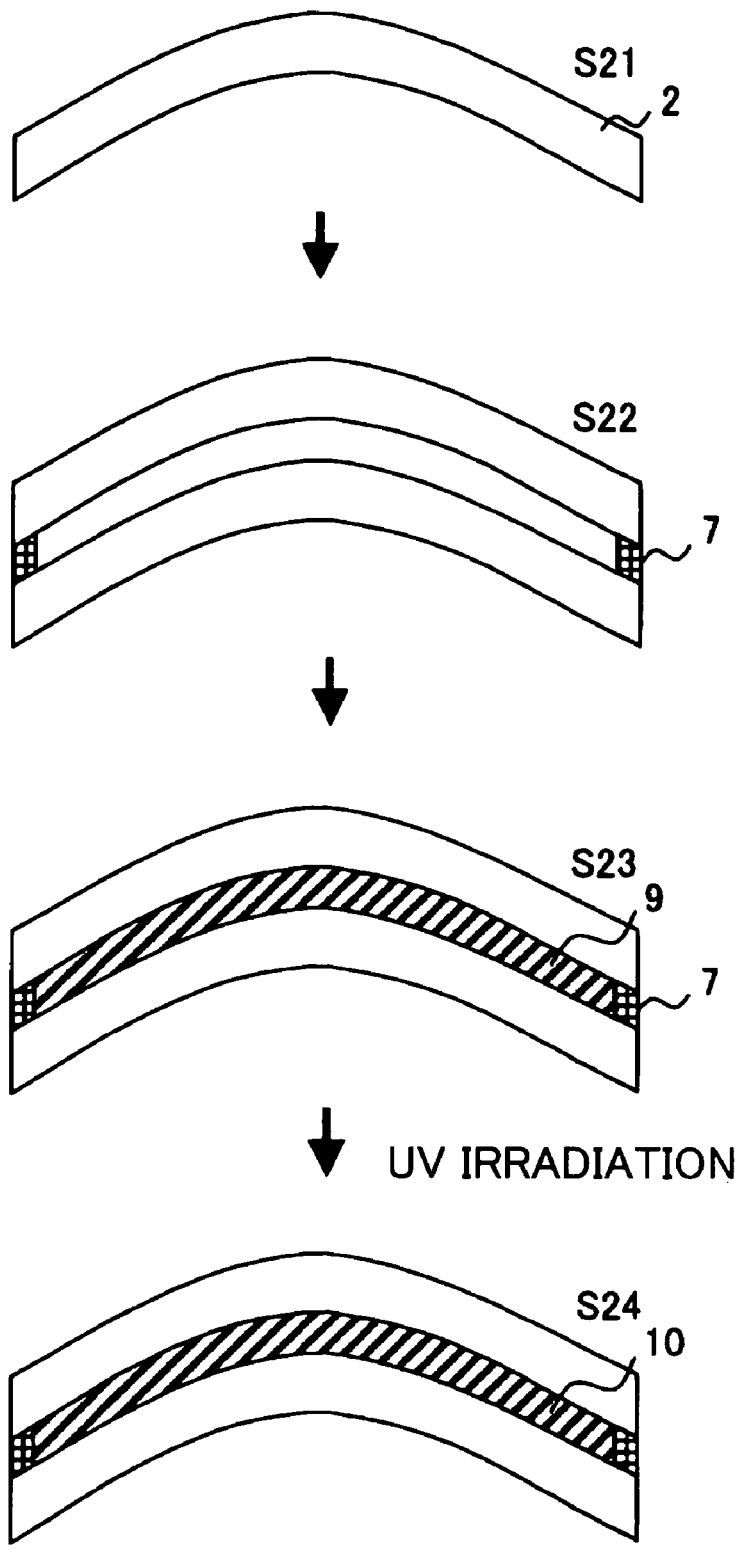
FIG. 2 illustrates a production flow of a liquid crystal panel according to the present invention.

FIG. 2 illustrates a production flow of a liquid crystal panel according to the present invention. From the top of FIG. 2 to the bottom, first, two substrates 2 without alignment control films thereon are prepared according to step S21, they are bonded together according to step S22, an uncured liquid crystal composition 9 comprising a liquid crystal and a resin composition is then introduced according to step S23, and UV rays are irradiated according to step S24 to form a liquid crystal display panel with a liquid crystal layer 10 comprising the liquid crystal and a cross-linked resin. The liquid crystal layer 10 is sealed with substrates 2 and a sealant 7. For the introduction of the liquid crystal composition in the case of a large-size panel, a titration method contributes more than a vacuum introduction method to the simplification of the production processes and the cost decrease. Also, compared with the vacuum introduction process, more versatile selection of liquid crystals is possible, leading to improved vertical alignment.

In order to make the cross-linked resin have an adhered, cross-linked structural part and hydrophobic, long-chain terminal parts, and to have a structure in which the hydrophobic, long-chain terminal parts rise from the liquid crystal layer contacting surface in the formed liquid crystal layer, it is possible to appropriately choose a liquid crystal, one or more first compounds having a cross-linkable structural part and a hydrophobic, long-chain terminal part, combinations of other coexisting materials, concentration thereof, cross-linking reaction temperature, cross-linking means, intensity of energy to be given, etc. The rate of the resin composition in the liquid crystal layer, that is, the concentration of the resin composition in the uncured liquid crystal composition comprising the resin composition and the liquid crystal, is preferably 1-5% by weight. The hydrophobic, long-chain terminal part is preferably in the range of from 75 to 95% by weight in the resin composition. In this way, an appropriate ratio of an adhered, cross-linked structural part to rising terminal parts can be realized.

It goes without saying that it is also possible to apply the aspects of the above-described liquid crystal panel according to the present invention to the method for manufacturing a liquid crystal panel according to the present invention, regarding the liquid crystal, hydrophobic, long-chain terminal part, adhered, cross-linked structural part, polar-group structural part, cross-linking, cross-linkable structural part, cross-liked resin, resin composition, first compound(s), second compound, third compound, uneven parts, slits of an electrode or electrodes, alignment control film, etc.

A liquid-crystal panel according to the present invention can align the liquid crystal vertically without an alignment control film when no voltage is applied. However, it is also acceptable to install an alignment control film.

The present invention is particularly useful when applied to a liquid crystal panel in which the liquid crystal has an negative dielectric constant anisotropy, is almost vertically aligned when no voltage is applied, and is tilted while the tilting direction is regulated by uneven parts formed on the substrate or slits of an electrode or electrodes, when voltage is applied.

It is to be noted that any known liquid crystals can be used for the purposes. For example, MLC-2038 made by Merck & Co., Inc. ($T_{N-I}$=80° C., $\Delta n$=0.1032, $\Delta\epsilon$=–5.0) can be used.

One aspect of the present invention is a liquid crystal panel having features as described above, wherein the outer surface of at least one substrate is curved. When the outer surface of a substrate is curved, it is difficult to apply such conventional technologies as described above to form an alignment control film. However, the liquid crystal panel according to the present invention has a function to control the alignment that can substitute for the alignment control film, and accordingly, it is possible to avoid this problem. According to this aspect of the present invention, the degree of freedom in the appearance of a liquid crystal panel is improved greatly, and liquid crystal panels having various shapes including a curved surface can be realized. FIG. 2 is an example.

Hereupon, it is not necessary that both substrates have curved surfaces. It is possible to have one substrate that has been processed to have a curved surface, and the other substrate having a flat surface. It is also effective to form active elements and filters on one of these substrate.

Another aspect of the present invention is a liquid crystal panel having features as described above, wherein the liquid crystal layer contacting surface is curved. When it is possible, installation of a flattening layer is not necessary, and it is possible to omit an alignment control film by employing this aspect of the present invention, even if, for example, the liquid crystal layer contacting surface is uneven owing to the uneven parts to regulate the alignment direction of a liquid crystal, with a result that the inner surfaces of the device can be improved, and a simplified, compact liquid crystal panel structure can be realized.

Figure 5:
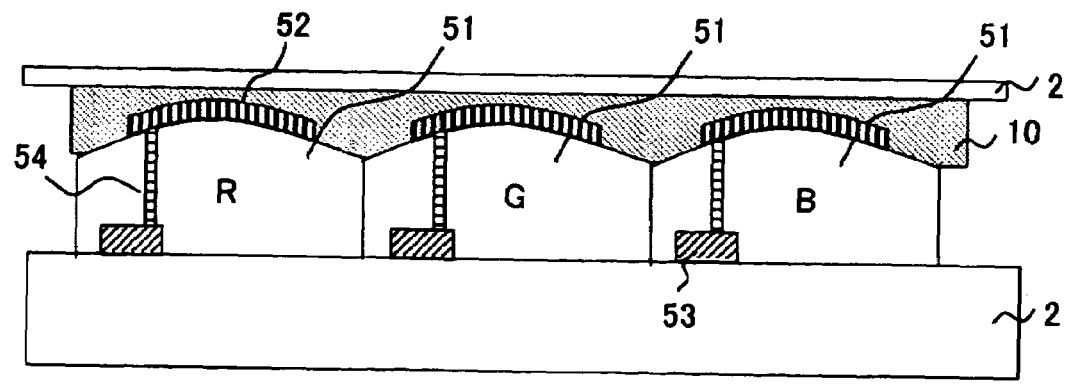
FIG. 5 is a model cross-sectional side view illustrating a case in which a liquid crystal panel has a filter layer and electrodes installed in contact with the filter layer, and the liquid crystal layer contacting surface is the surfaces of the filter layer and the electrodes installed in contact with the filter layer.

Furthermore, when a liquid crystal panel has a filter layer and the liquid crystal layer contacting surface is the surface of the filter layer and/or the surface of an electrode or electrodes installed in contact with the filter layer, a filter layer 51 is formed on one of the substrate, electrodes 52 having slits are formed on the surface, and accordingly, the filter layer 51 and the electrodes 52 have curved surfaces, as shown in FIG. 5. In this case, by virtue of the aspects of the present invention, it is possible to omit an alignment control film, and a simplified structure is realized since flattening of the filter layer is not needed. In FIG. 5, the electrodes 52 are electrically connected with active elements 53 such as TFT's (thin film transistors) via contact holes 54. An electrode on the side of the counter substrate 2 is not illustrated.

Figure 6:
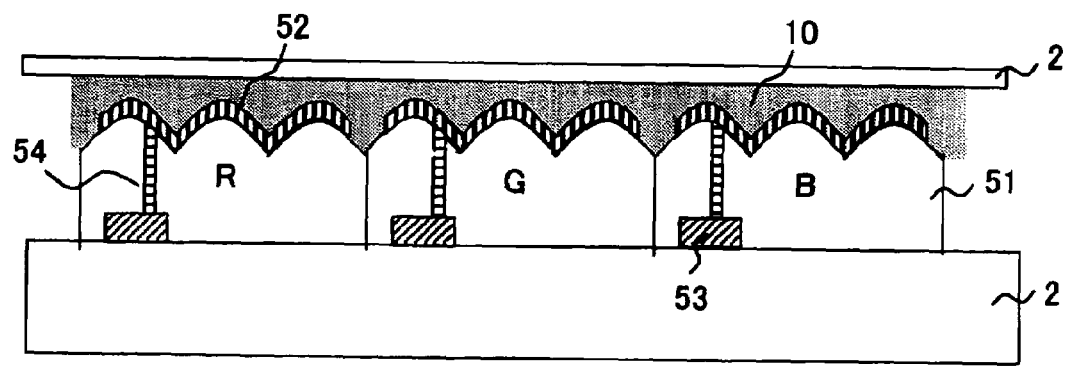
FIG. 6 is another model cross-sectional side view illustrating a case in which a liquid crystal panel has a filter layer and electrodes installed in contact with the filter layer, and the liquid crystal layer contacting surface is the surfaces of the filter layer and the electrodes installed in contact with the filter layer.

In this case, it is also possible that the curved surface part has a plurality of concavities and/or convexities within a pixel as shown in FIG. 6. Accordingly, a compact structure can be realized by endowing these plural concavities and convexities with a function of uneven parts to regulate the alignment direction of a liquid crystal.

Figure 7:
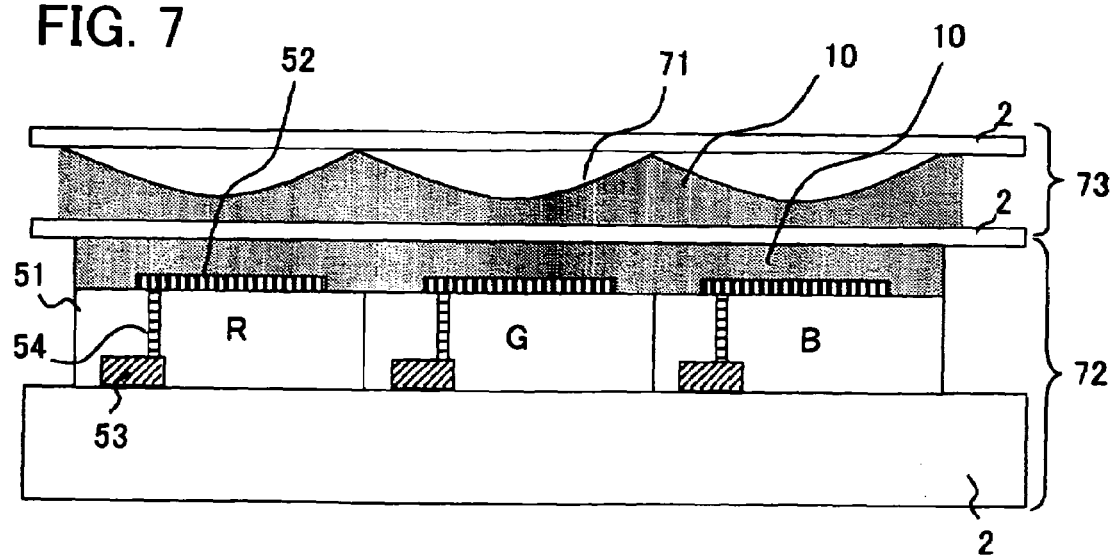
FIG. 7 is a model cross-sectional side view illustrating a liquid crystal panel having a liquid crystal display layer combined with a liquid crystal optical compensation layer.

Furthermore, it is also possible to stack a plurality of liquid crystal panels to form a liquid crystal panel as a combination of a liquid crystal display layer 72 and an optical compensation liquid crystal layer 73 having lenses 71, as shown in FIG. 7. It is to be noted that the function of the optical compensation liquid crystal layer 73 can also be utilized independently for a liquid crystal lens.

Figure 8:
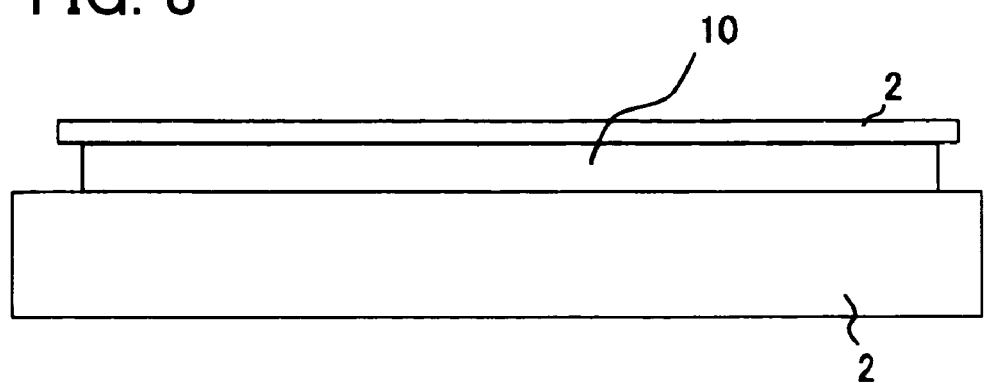
FIG. 8 is a model cross-sectional side view illustrating a liquid crystal panel in which the thickness of one of the substrates is not more than ½ of the thickness of the other substrate.

Another aspect of the present invention is a liquid crystal panel having the features described above, wherein the thickness of one of the substrates is not more than ½ of the thickness of the other substrate. FIG. 8 shows an example.

In this case, installation of an alignment control film on the thinner substrate according to the conventional technologies is often difficult. However, the liquid crystal panel according to the present invention has a function to control the alignment that can substitute for the alignment control film, and accordingly, it is possible to avoid this problem.

As one of the effects of this aspect of the present invention, weight reduction of a liquid crystal panel can be pointed out, together with increased freedom of appearance and slim appearance. In some cases, flexibility to a certain extent can also be realized.

Figure 9:
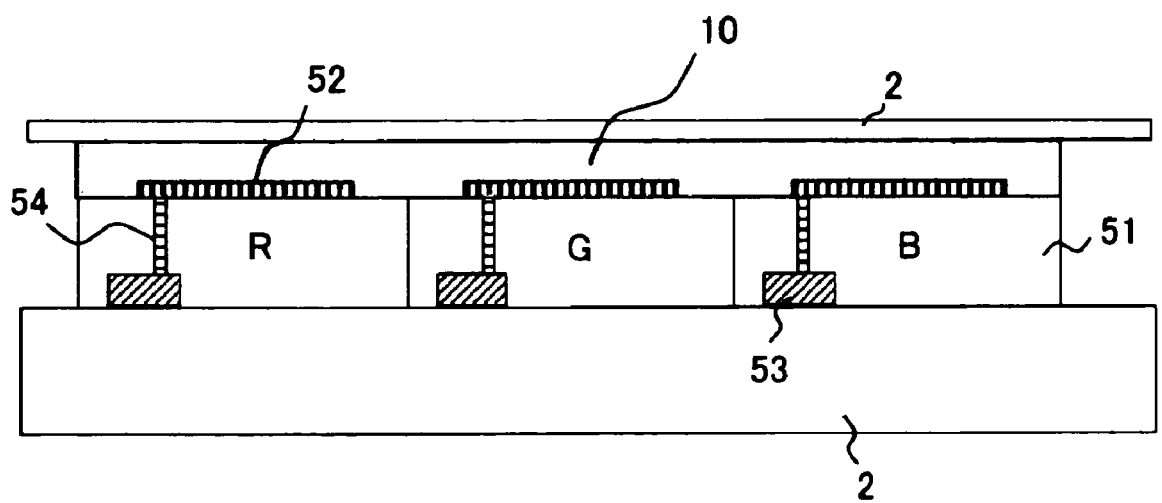
FIG. 9 is another model cross-sectional side view illustrating a liquid crystal panel in which the thickness of one of the substrates is not more than ½ of the thickness of the other substrate.

Furthermore, improved display brightness and cost reduction derived from a higher open-area ratio are possible, when active elements 53 such as TFT's (thin film transistors) are formed on one of the substrates, followed by formation of the filters 51 as shown in FIG. 9.

In order to realize the features of the various aspects of the present invention, the thickness of at least one substrate is preferably in the range of from 100 to 500 μm. If it is thinner than 100 μm, the thermal durability and mechanical durability of the substrate are insufficient, and formation of uniform panel gap is difficult. If it is thicker than 500 μm, merits in weight reduction are not enough. The thickness is more preferably in the range of 200-400 μm.

There is no particular limitation to the material for the substrates, and a different material can be used for each substrate. Regarding the thinner substrate, those made of a plastic material or a plastic film may be more preferable, since mechanical properties are excellent, weight reduction is easier, and requirement for flexibility may be met.

The aspects of the present invention can be combined with each other appropriately for applications. A liquid crystal panel according to the present invention can be utilized for a liquid crystal display apparatus, most typically, such as a display apparatus for a personal computer and a television receiver, by attaching drive units, etc. It goes without saying that the liquid crystal panel can be utilized for any other applications where the function to control the manner of light transmission by means of a liquid crystal is needed. For example, liquid crystal shutters, liquid crystal projectors, photochromic glasses and displays for portable information terminals are enumerated.

EXAMPLES

Examples and comparative examples for the present invention follow below.

Example 1

A 0.4 mm-thick polycarbonate substrate with an ITO (indium-tin oxide) transparent electrode that had been processed to have a curved surface with a curvature radius of 200 mm, and a 0.7 mm-thick glass substrate having the same curvature radius were bonded together using a thermosetting sealant, without forming an alignment control film, to form a blank cell.

A liquid crystal (liquid crystal D) made by Merck & Co., Inc. having a negative dielectric constant anisotropy as shown in TABLE 1 in an amount of 98 parts by weight was mixed with 2 parts by weight of an acrylate resin composition according to the present invention to form a liquid crystal mixture. For the resin composition according to the present invention, used was a mixture made by adding 2.5% by weight of a polymerization initiator Irgacure 651 made by Ciba-Geigy Specialty Chemicals Co. to the whole amount of a mixture obtained by mixing lauryl acrylate as a monofunctional monomer and HDDA (1,6-hexanediol diacrylate) made by Nihon Kayaku K.K. as a divalent monomer at a ratio of 15:1.

In this case, the first compound(s) was composed of two compounds, that is, lauryl acrylate and HDDA. Furthermore, HDDA corresponded to the second compound with a cross-linkable structural part and substantially without a hydrophobic, long-chain terminal part according to the present invention, and lauryl acrylate corresponded to the third compound having a hydrophobic, long-chain terminal part and one polymerizable group. The 1,6-hexanediol diacrylate part or the diacrylate part corresponded to the cross-linkable structural part of the first compound(s) according to the present invention, the lauryl group of lauryl acrylate corresponded to a hydrophobic, long-chain terminal part, and the carboxy group corresponded to the polar group structural part.

The liquid crystal mixture was introduced into the above-described blank cell by a vacuum introduction method After the introduction, the cell was sealed by a visible light-curable resin followed by UV irradiation at 3 J/cm² onto the liquid crystal cell. When observed using crossed nicols, this liquid crystal cell showed good, uniform, vertical alignment when no voltage was applied.

After the UV irradiation, the cell was disassembled, washed with acetone to remove the liquid crystal, and the substrate surface that had been contacted with the liquid crystal was observed. As a result, it was confirmed that a polymer film was left on the surface. The substrates were reassembled, a liquid crystal was reintroduced, and the state of alignment was observed. A state of vertical alignment that was about the same as the one before the disassembling was observed. Accordingly, the existence of an adhered, cross--linked structural part and rising terminal parts was confirmed.

Example 2

The same experiment as for EXAMPLE 1 was conducted to form a liquid crystal cell except that instead of liquid crystal D, various liquid crystals made by Merck & Co., Inc. as shown in TABLE 1 were used. When observed, this liquid crystal cell showed good, uniform, vertical alignment when no voltage was applied.

It is to be noted that TABLE 1 also shows data for EXAMPLE 1 with liquid crystal D. In TABLE 1, "negative, fluorinated" means that the corresponding liquid crystal is a fluorinated liquid crystal and has a negative dielectric constant anisotropy. $T_{N-I}$ indicates a transition point between a nematic phase and an isotropic phase, $T_{S-N}$, a transition point between a smectic phase and a nematic phase, $\Delta n$, a refractive index anisotropy, $\Delta\epsilon$, a dielectric constant anisotropy, K11, an elastic coefficient (spray), K33, an elastic coefficient (bend), $\gamma 1$, a rotational viscosity.

TABLE 1 shows that those negative, fluorinated liquid crystals had excellent effects.

TABLE 1

| Physical properties | Liquid crystal A, negative, fluorinated | Liquid crystal C, negative, fluorinated | Liquid crystal D, negative, fluorinated | Liquid crystal E, negative, fluorinated | Liquid crystal G, negative, fluorinated |
|---|---|---|---|---|---|
| $T_{N-I}$ (° C.) | 65 | 62 | 71 | 71 | 71 |
| $T_{S-N}$ (° C.) | <−20 | <−20 | <−30 | <−30 | <−20 |
| $\Delta n$ | 0.0995 | 0.0793 | 0.0822 | 0.0825 | 0.0836 |
| $\Delta\epsilon$ | −7.0 | −5.1 | −3.8 | −3.5 | −2.1 |
| K11 | 12.3 | — | 13.6 | 13.3 | 12.9 |
| K33 | 13.0 | — | 14.7 | 13.3 | 15.0 |
| $\gamma 1$ (mPa) | 239 | 153 | 135 | 141 | 111 |
| Vertical alignment | ◉* | ◉* | ◉* | ○* | ○* |

*◉: excellent
○: good

Example 3

The same experiment as for EXAMPLE 1 was conducted to form a liquid crystal cell except that a pair of glass substrates A and B having transparent electrodes were prepared, fine uneven parts were formed on the substrate A thorough photolithographic and heat treating processes with a photosensitive resin no uneven parts were formed on the substrate B, and the substrates A and B were bonded together with a curable sealant to form a blank cell. When observed, this liquid crystal cell showed good, uniform, vertical alignment when no voltage was applied.

Example 4

The same experiment as for EXAMPLE 1 was, conducted to form a liquid crystal cell except that a 0.7 mm thick glass substrate with a pattern of transparent electrodes made of ITO (indium-tin oxide) thereon, and a 150 μm-thick polycarbonate film substrate with a pattern of transparent electrodes made of ITO (indium-tin oxide) thereon were cleaned, respectively, had spacer particles having a particle size of 4.0 μm dispersed thereon, and were bonded together by a thermosetting sealant to form a blank cell. When observed, this liquid crystal cell showed good, uniform, vertical alignment when no voltage was applied. The maximum temperature in this series of the processes for manufacturing the liquid crystal cell was 130° C. (for one four) at the curing of the sealant, which was significantly lower than 180-250° C. that is required when a conventional alignment control film is employed. Accordingly, plastic deformation of the film substrate did not occur. The weight reduction of the liquid crystal panel was about 40% in comparison with the case in which 0.7 mm-thick glass substrates were used for both substrates.

Example 5

The same experiment as for EXAMPLE 4 was conducted to form a liquid crystal cell except that a 0.4 mm-thick glass substrate was used instead of the 150 μm-thick polycarbonate film substrate. When observed, this liquid crystal cell showed good, uniform, vertical alignment when no voltage was applied. The weight reduction of the liquid crystal panel was about 25% in comparison with the case in which 0.7 mm-thick glass substrates were used for both substrates.

Example 6

The same experiment as for EXAMPLE 4 was conducted to form a liquid crystal cell except that a 150 μm-thick polycarbonate film substrate was used instead of the 0.7 mm-thick glass substrate. When observed, this liquid crystal cell showed good, uniform, vertical alignment when no voltage was applied. The weight reduction of the liquid crystal panel was about 80%, in comparison with the case in which 0.7 mm-thick glass substrates were used for both substrates. It was possible to bend this liquid crystal panel manually.

Example 7

A substrate A obtained by forming a color filter layer, on a TFT substrate having a diagonal length of 15 inches (XGA), and a substrate B having an ITO counter electrode formed as facing the substrate A were bonded together to form a type 15 panel. As a result, a good liquid crystal panel was obtained.

Example 8

When a substrate C was bonded onto the panel in EXAMPLE 7 with a counter electrode in between, a good liquid crystal panel having a lens structure as shown in FIG. 7 was obtained

Example 9

The same experiment as for EXAMPLE 1 was conducted to form a liquid crystal cell except that as a resin composition according to the present invention, a monomer represented by formula (18) below was used instead of the resin composition of EXAMPLE 1 but in the same amount. When observed, this liquid crystal cell showed good, uniform, vertical alignment when no voltage was applied.

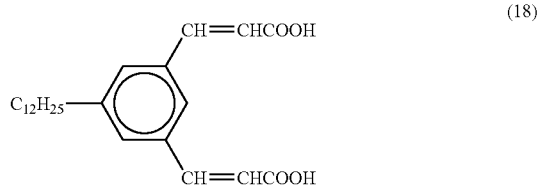

(18)

What is claimed is:

1. A liquid crystal panel having a liquid crystal layer sandwiched between a pair of substrates, wherein:
    said liquid crystal layer comprises a liquid crystal and a cross-linked resin;
    said cross-linked resin includes an adhered cross-linked structural part, which is a cross-linked structural part adhered to an upper surface of one of the pair of substrates and a rising terminal part, which is a terminal part rising from said upper surface toward said liquid crystal;
    an outer surface of at least one of the pair of substrates is curved, and
    said liquid crystal layer is formed by cross-linking, in the presence of a liquid crystal, a resin composition comprising one or more first compounds having a cross-linkable structural part, and a hydrophobic terminal part with a straight-chain section having three or more carbon atoms (hydrophobic, long-chain terminal part);
    said cross-linkable structural part of the one or more first compounds comprises a polar-group structural part; and
    at least one compound represented by formula (1) or (2) below is included as the one or more first compounds:

(in formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other in the formulae).

2. A liquid crystal panel according to claim 1, wherein said upper surface is curved.

3. A liquid crystal panel according to claim 1, wherein said liquid crystal panel has a filter layer, and said upper surface is a surface of the filter layer or the surface of an electrode or electrodes installed in contact with the filter layer.

4. A liquid crystal panel according to claim 1, wherein the thickness of one of the pair of substrates is not more than ½ of the thickness of the other of said pair of substrates.

5. A liquid crystal panel according to claim 1, wherein the thickness of at least one of the pair of substrates is in the range of from 100 to 500 μm.

6. A liquid crystal panel according to claim 1, wherein the material of one of the pair of substrates is different from that of the other of the pair of substrates.

7. A liquid crystal panel according to claim 6, wherein said pair of substrates comprises a glass substrate and a plastic substrate.

8. A liquid crystal panel according to claim 1, wherein said liquid crystal tilts while the tilting direction is regulated by uneven parts or slits of an electrode or electrodes when voltage is applied.

9. A liquid crystal panel according to claim 1, wherein said panel does not have an alignment control film.

10. A liquid crystal panel according to claim 1, wherein said liquid crystal has a negative dielectric anisotropy.

11. A liquid crystal panel according to claim 1, wherein said one or more first compounds comprise a second compound with a cross-linkable structural part and substantially without a hydrophobic, long-chain terminal part.

12. A liquid crystal panel according to claim 11, wherein at least one compound selected from the group consisting of the compounds represented by formulae (3) to (6) below is included as the second compound,

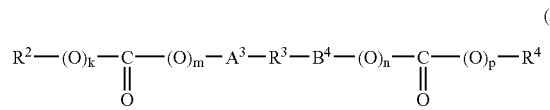

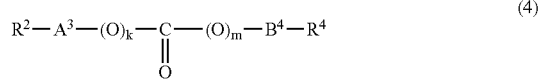

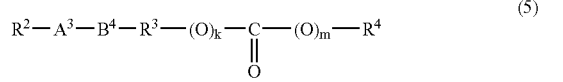

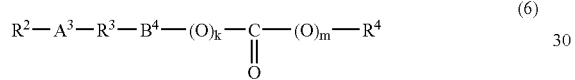

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other in the formulae).

13. A liquid crystal panel according to claim 12, wherein at least one compound selected from the group consisting of the compounds represented by formulae (7) to (10) below is included as the second compound, (in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other in the formulae).

14. A liquid crystal panel according to claim 1, wherein said adhered cross-linked structural part forms a thin film on said upper surface of said one of the pair of substrates.

15. A liquid crystal panel having a liquid crystal layer sandwiched between a pair of substrates, wherein:
said liquid crystal layer comprises a liquid crystal and a cross-linked resin;
said cross-linked resin includes an adhered cross-linked structural part, which is a cross-linked structural part adhered to an upper surface of one of the pair of substrates and a rising terminal part, which is a terminal part rising from said upper surface toward said liquid crystal;
said upper surface is curved,
said liquid crystal layer is formed by cross-linking, in the presence of a liquid crystal, a resin composition comprising one or more first compounds having a cross-linkable structural part, and a hydrophobic terminal part with a straight-chain section having three or more carbon atoms (hydrophobic, long-chain terminal part);
said cross-linkable structural part of the one or more first compounds comprises a polar-group structural part; and
at least one compound represented by formula (1) or (2) below is included as the one or more first compounds:

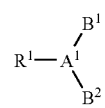

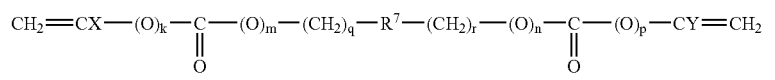

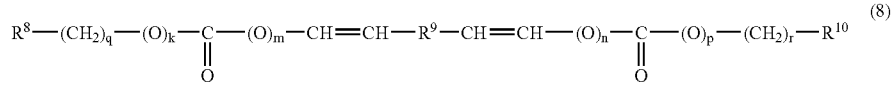

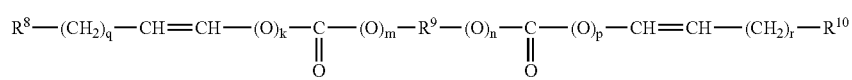

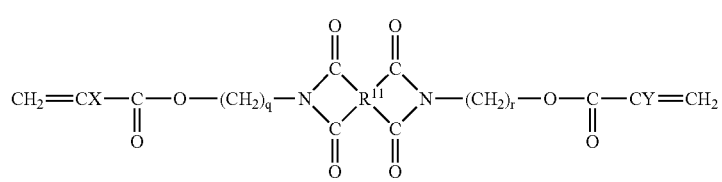

-continued

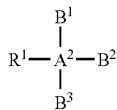
(2)

(in formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other in the formulae).

16. A liquid crystal panel according to claim 15, wherein said liquid crystal panel has a filter layer, and said upper surface is a surface of the filter layer or the surface of an electrode or electrodes installed in contact with the filter layer.

17. A liquid crystal according to claim 15, wherein said curved surface of said upper surface is composed of a plurality of concavities and convexities.

18. A liquid crystal panel according to claim 15, wherein the thickness of one of the pair of substrates is not more than ½ of the thickness of the other of said pair of substrates.

19. A liquid crystal panel according to claim 15, wherein the thickness of at least one of the pair of substrates is in the range of from 100 to 500 μm.

20. A liquid crystal panel according to claim 15, wherein the material of one of the pair of substrates is different from that of the other of the pair of substrates.

21. A liquid crystal panel according to claim 20, wherein said pair of substrates comprises a glass substrate and a plastic substrate.

22. A liquid crystal panel according to claim 15, wherein said liquid crystal tilts while the tilting direction is regulated by uneven parts or slits of an electrode or electrodes when voltage is applied.

23. A liquid crystal panel according to claim 15, wherein said panel does not have an alignment control film.

24. A liquid crystal panel according to claim 15, wherein said liquid crystal has a negative dielectric anisotropy.

25. A liquid crystal panel according to claim 15, wherein said one or more first compounds comprise a second compound with a cross-linkable structural part and substantially without a hydrophobic, long-chain terminal part.

26. A liquid crystal panel according to claim 25, wherein at least one compound selected from the group consisting of the compounds represented by formulae (3) to (6) below is included as the second compound,

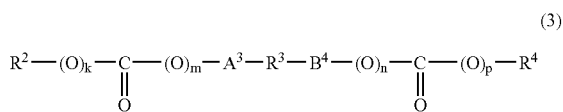
(3)

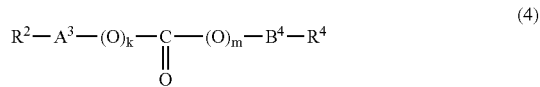
(4)

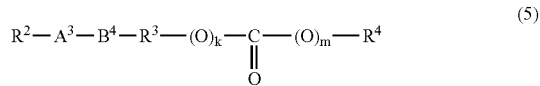
(5)

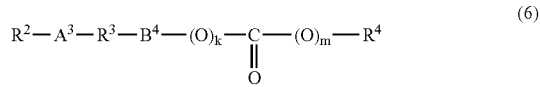
(6)

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other in the formulae).

27. A liquid crystal panel according to claim 26, wherein at least one compound selected from the group consisting of the compounds represented by formulae (7) to (10) below is included as the second compound,

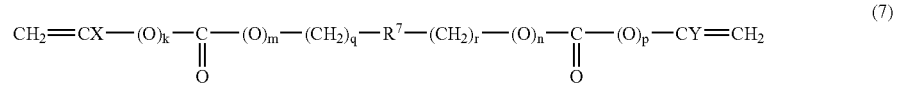
(7)

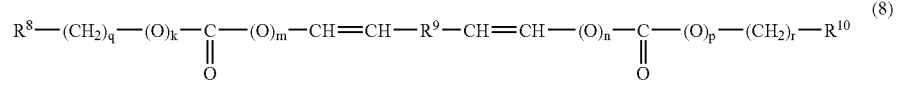
(8)

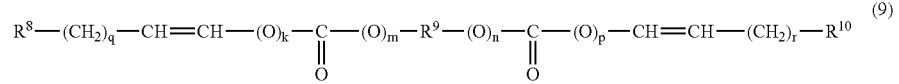
(9)

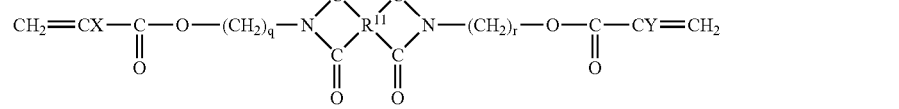
(10)

(in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other in the formulae).

28. A liquid crystal panel having a liquid crystal layer sandwiched between a pair of substrates, wherein:

said liquid crystal layer comprises a liquid crystal and a cross-linked resin;

said cross-linked resin includes an adhered cross-linked structural part, which is a cross-linked structural part adhered to an upper surface of one of the pair of substrates and a rising terminal part, which is a terminal part rising from said upper surface toward said liquid crystal;

a thickness of one of the pair of substrates is not more than ½ of a thickness of the other of the pair of substrates, said liquid crystal layer is formed by cross-linking, in the presence of a liquid crystal, a resin composition comprising one or more first compounds having a cross-linkable structural part, and a hydrophobic terminal part with a straight-chain section having three or more carbon atoms (hydrophobic, long-chain terminal part);

said cross-linkable structural part of the one or more first compounds comprises a polar-group structural part; and at least one compound represented by formula (1) or (2) below is included as the one or more first compounds:

(1)

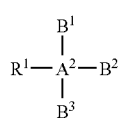

(2)

(in formulae (1) and (2), $R^1$ is a hydrophobic, long-chain terminal part: $A^1$ is a trivalent group comprising an aliphatic chain that may be branched an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other in the formulae).

29. A liquid crystal panel according to claim 28, wherein the thickness of at least one of the pair of substrates is in the range of from 100 to 500 μm.

30. A liquid crystal panel according to claim 28, wherein the material of one of the pair of substrates is different from that of the other of the pair of substrates.

31. A liquid crystal panel according to claim 30, wherein said pair of substrates comprises a glass substrate and a plastic substrate.

32. A liquid crystal panel according to claim 28, wherein said liquid crystal tilts while the tilting direction is regulated by uneven parts or slits of an electrode or electrodes when voltage is applied.

33. A liquid crystal panel according to claim 28, wherein said panel does not have an alignment control film.

34. A liquid crystal panel according to claim 28, wherein said liquid crystal has a negative dielectric anisotropy.

35. A liquid crystal panel according to claim 28, wherein said one or more first compounds comprise a second compound with a cross-linkable structural part and substantially without a hydrophobic, long-chain terminal part.

36. A liquid crystal panel according to claim 35, wherein at least one compound selected from the group consisting of the compounds represented by formulae (3) to (6) below is included as the second compound,

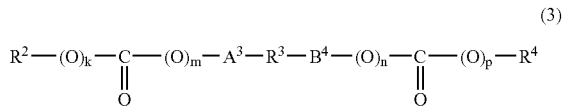

(3)

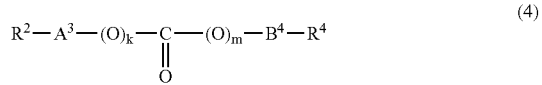

(4)

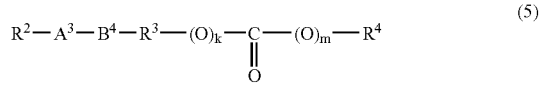

(5)

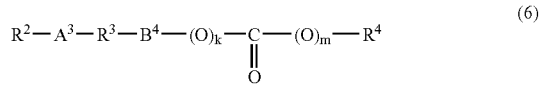

(6)

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other in the formulae).

37. A liquid crystal panel according to claim 36, wherein at least one compound selected from the group consisting of the compounds represented by formulae (7) to (10) below is included as the second compound,

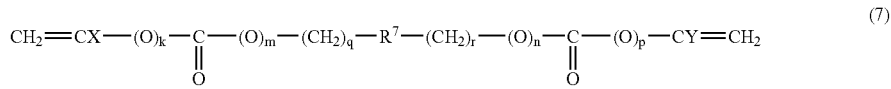

(7)

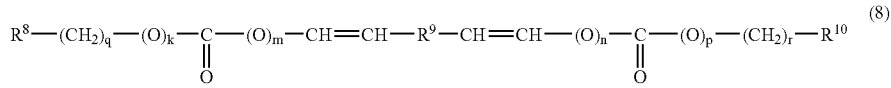

(8)

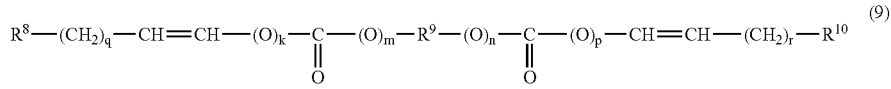

(9)

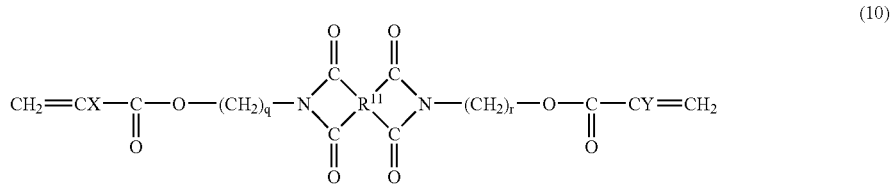

(10)

(in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other in the formulae).

\* \* \* \* \*